(12) United States Patent
Yamanaka

(10) Patent No.: US 6,765,067 B2
(45) Date of Patent: Jul. 20, 2004

(54) SOUND INSULATING COMPOSITE MATERIAL AND SOUND INSULATING COVER MEMBER MADE OF SAME

(75) Inventor: Hirotsugu Yamanaka, Chiba (JP)

(73) Assignee: Kinugawa Rubber Ind. Co., Ltd., Chiba (JP)

( * ) Notice: Subject to any disclaimer, the term of this patent is extended or adjusted under 35 U.S.C. 154(b) by 0 days.

(21) Appl. No.: 10/106,102

(22) Filed: Mar. 27, 2002

(65) Prior Publication Data

US 2003/0013820 A1 Jan. 16, 2003

(30) Foreign Application Priority Data

Apr. 4, 2001 (JP) ........................................ 2001-105478

(51) Int. Cl.[7] ............................................ C08F 210/16
(52) U.S. Cl. ............................. 525/333.8; 525/332.1; 525/332.5; 525/331.7; 525/240; 525/232; 525/236; 524/423; 524/437; 524/495
(58) Field of Search ........................... 524/436, 423, 524/495, 210; 529/240; 525/232, 331.7

(56) References Cited

U.S. PATENT DOCUMENTS

| | | | |
|---|---|---|---|
| 4,212,787 A | * | 7/1980 | Matsuda et al. ............. 525/211 |
| RE32,028 E | * | 11/1985 | Fischer ......................... 525/194 |
| 4,912,148 A | * | 3/1990 | Kim et al. .................... 524/487 |
| 4,985,502 A | * | 1/1991 | Izumi et al. .................. 525/194 |
| 5,552,482 A | * | 9/1996 | Berta ............................ 525/88 |
| 5,728,744 A | * | 3/1998 | Okada et al. ................. 521/95 |
| 5,824,731 A | * | 10/1998 | Rondy et al. ................ 524/496 |
| 5,852,100 A | * | 12/1998 | Sadatoshi et al. ............ 524/505 |
| 5,869,563 A | * | 2/1999 | Kawasaki et al. ........... 524/525 |
| 6,362,270 B1 | * | 3/2002 | Chaudhary et al. ......... 524/515 |
| 6,500,900 B1 | * | 12/2002 | Itoh ............................. 525/216 |
| 6,590,038 B2 | * | 7/2003 | Yu et al. ...................... 525/240 |
| 2003/0013820 A1 | * | 1/2003 | Yamanaka ................... 525/387 |

FOREIGN PATENT DOCUMENTS

JP        1-271444        10/1989

* cited by examiner

*Primary Examiner*—David W. Wu
*Assistant Examiner*—Rip A Lee
(74) *Attorney, Agent, or Firm*—Foley & Lardner LLP

(57) ABSTRACT

A sound insulating composite material contains (a) a crosslinked polymer containing 100 parts by weight of an ethylene-propylene rubber, 20–100 parts by weight of a polyethylene, and 100–200 parts by weight of a polypropylene; and (b) an inorganic filler in an amount of 200–500 parts by weight relative to 100 parts by weight of the ethylene-propylene rubber. The crosslinked polymer is prepared by a dynamic crosslinking of the ethylene-propylene rubber with the polyethylene and the polypropylene in the presence of an organic peroxide. The sound insulating composite material can be produced by (a) preparing a mixture containing the ethylene-propylene rubber, the polyethylene, the polypropylene, and the organic peroxide; and (b) kneading the mixture while the mixture is in a melted condition, thereby generating the dynamic crosslinking.

10 Claims, 3 Drawing Sheets

SOUND INSULATING COMPOSITE MATERIAL AND SOUND INSULATING COVER MEMBER MADE OF SAME

BACKGROUND OF THE INVENTION

The present invention relates to a sound insulating composite material used for automotive sound insulation and the like, and to a sound insulating cover member (made of the sound insulating composite material) disposed between automotive passenger compartment and engine compartment.

For example, an automotive steering shaft is equipped with a sound insulating cover member at a position between passenger compartment and engine compartment for the purpose of sound insulation and the like. In FIG. 4, a steering shaft 41 is passed through a through hole 43 of a dash panel 42 and connected to a steering box (not shown in the drawings). A sound insulating cover member 44 is formed on the steering shaft 41 for sealingly cover the through hole 43 for the purpose of sound insulation and preventing entry of dust and the like from an engine compartment 45 into a passenger compartment 46.

The sound insulating cover member 44 is required to have superior heat resistance and superior weather resistance since it is exposed to a high temperature atmosphere (particularly its engine compartment side) and to various weathers. Furthermore, it is required to have a good sound insulating property for providing a good habitability in the passenger compartment 46.

Japanese Patent Unexamined Publication JP-A-1-271444 discloses a sound insulating hole cover for covering a steering shaft hole between engine compartment and passenger compartment. This sound insulating hole cover is made of a composition containing 100 parts by weight of a polymer (EPM or EPDM) and 130–850 parts by weight of at least one inorganic filler selected from zinc flower, titanium oxide and barium sulfate. Due to this high content of the inorganic filler, the sound insulating hole cover may become insufficient in ordinary state properties (hardness, tensile strength and elasticity). Therefore, it may become difficult to fix the sound insulating hole cover to the dash panel using bolts or the like. Furthermore, the sound insulating hole cover may become inferior in sound insulation in a particular frequency range (e.g., about 500–1,200 Hz), since it tends to resonate to sound of engine compartment or the like due to the rubber elasticity property.

There is another conventional sound insulating cover member prepared by laminating together a first layer (made of a resin composition) and a second layer (made of a rubber composition). Although this cover member is capable of providing good ordinary state properties, the cost for producing the cover member is relatively high since the number of parts constituting this cover member becomes larger than other types of a single layer. Furthermore, it may become difficult to mount a laminate of the first and second layers at a proper position.

SUMMARY OF THE INVENTION

It is therefore an object of the present invention to provide a sound insulating composite material that is free from the above-mentioned problems.

It is another object of the present invention to provide a sound insulating composite material that is superior in ordinary state properties, sound insulation and heat resistance and does not resonate to sound of an automotive engine compartment or the like.

It is still another object of the present invention to provide a sound insulating cover member that is superior in mounting easiness, sound insulation, heat resistance and weather resistance.

It is a further object of the present invention to provide a process for producing the sound insulating composite material.

According to the present invention, there is provided a sound insulating composite material. This material comprises:

a crosslinked polymer containing 100 parts by weight of an ethylene-propylene rubber, 20–100 parts by weight of a polyethylene, and 100–200 parts by weight of a polypropylene, said crosslinked polymer being prepared by a dynamic crosslinking of said ethylene-propylene rubber with said polyethylene and said polypropylene in the presence of an organic peroxide; and an inorganic filler in an amount of 200–500 parts by weight relative to 100 parts by weight of said ethylene-propylene rubber.

According to the present invention, there is provided a sound insulating cover member comprising said sound insulating composite material.

According to the present invention, there is provided a process for producing said sound insulating composite material. This process comprises:

(a) preparing a mixture containing said ethylene-propylene rubber, said polyethylene, said polypropylene, and said organic peroxide; and (b) kneading said mixture while said mixture is in a melted condition, thereby generating said dynamic crosslinking.

DETAILED DESCRIPTION

Figure 4:
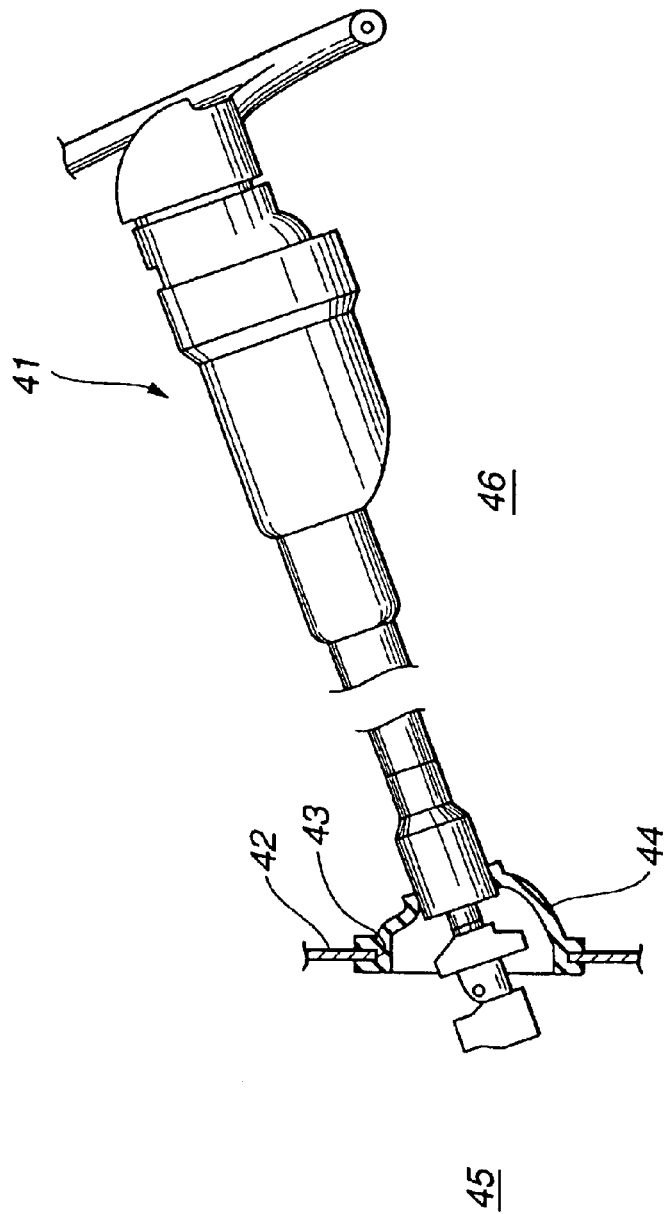
FIG. 4 is a partially sectional side view showing a sound insulating composite material mounted on an automotive steering shaft.

A sound insulating composite material according to the present invention may contain a vulcanization aid, carbon black, and a processing aid (e.g., plasticizer and tackifier), besides the crosslinked polymer, an inorganic filler and an organic peroxide, to provide superior ordinary state properties, superior sound insulation and heat resistance. The organic peroxide is used as a crosslinking agent for crosslinking three essential components (i.e., an ethylene-propylene rubber, a polyethylene and a polypropylene) of the crosslinked polymer. The sound insulating composite material can be shaped in accordance with the configuration of automotive dash panel and steering shaft into a sound insulating cover member that is superior in mounting easiness, sound insulation, heat resistance and weather resistance (see FIG. 4).

The ethylene-propylene rubber (i.e., the first component of the crosslinked polymer) may be a terpolymer (EPDM)

prepared by polymerizing ethylene, propylene and unconjugated diene. The first component can be a polymer having an average molecular weight of 350,000–750,000. Furthermore, the first component may be (a) a binary copolymer (EPM) prepared by polymerizing ethylene and propylene or (b) an oil extended polymer containing a paraffinic extension oil. The first component is preferably a polymer having a relatively high molecular weight, in view of ordinary state properties of the sound insulating composite material.

The inorganic filler of the sound insulating composite material may be at least one selected from zinc oxide (zinc flower), barium sulfate and titanium dioxide. Of these, it is preferable to use zinc oxide and/or barium sulfate in view of sound insulation and ordinary state properties of the sound insulating composite material. It is the most practical to use barium sulfate in view of its commercial product price.

It is possible to produce a sound insulating composite material according to the present invention by a process comprising the steps of (a) mixing together an ethylene-propylene rubber (the first component), a polyethylene (the second component), a polypropylene (the third component), a crosslinking agent (e.g., vulcanization agent and vulcanization aid), carbon black, and a processing aid (e.g., plasticizer and tackifier); and (b) kneading the mixture while the mixture is in a melted condition, thereby generating a dynamic crosslinking of the first, second and third components. In fact, an organic peroxide is used as the crosslinking agent to generate the dynamic crosslinking, in view of thermal aging resistance and other properties of the sound insulating composite material.

The carbon black is not particularly limited to one having a special high grade. The carbon black is preferably in an amount of about 5–50 parts by weight relative to 100 parts of the first component, in view of processability and ordinary state properties of the sound insulating composite material. It is possible to use a process oil as the plasticizer. Furthermore, it is preferable to use a paraffinic process oil in view of its compatibility with the first, second and third components. The amount of the process oil may be determined, for example, in accordance with Mooney viscosity of the rubber composition (i.e., the first component). For example, its amount is about 5–50 parts by weight relative to 100 parts by weight of the first component. Its amount is, however, not particularly limited in case that an oil extended polymer is used as the first component.

EXAMPLE

Test samples S1 to S18 of the sound insulating composite materials were prepared by mixing together chemical components shown in Table 1 and then by kneading each mixture while the mixture was in a melted condition, thereby generating a dynamic crosslinking of the first, second and third components. In fact, the first component was 100 parts by weight of an EPDM, that is, KELTAN 5631 A (trade name) of DSM Co. This EPDM was prepared by mixing together 100 parts by weight of the polymer proper and 40 parts by weight of a paraffinic extension oil. The second component (polyethylene) was UJ480 (trade name) of Nihon Polychem Co. The third component (polypropylene) was BC03D (trade name) of Nihon Polychem Co. The peroxide was PERHEXA 25B-40 (trade name) of NOF (Nihon Yushi) Co. The stearic acid amide (a tackifier) was DIAMID 0–200 (trade name) of Nippon Kasei Chemical Co.

TABLE 1

| Chemical Components (parts by weight) | S1 | S2 | S3 | S4 | S5 | S6 | S7 | S8 | S9 | S10 | S11 | S12 | S13 | S14 | S15 | S16 | S17 | S18 |
|---|---|---|---|---|---|---|---|---|---|---|---|---|---|---|---|---|---|---|
| EPDM | 100 | 100 | 100 | 100 | 100 | 100 | 100 | 100 | 100 | 100 | 100 | 100 | 100 | 100 | 100 | 100 | 100 | 100 |
| Polyethylene | 15 | 20 | 50 | 100 | 120 | 50 | 50 | 50 | 50 | 50 | 50 | 50 | 50 | 50 | 50 | 50 | 50 | 50 |
| Polypropylene | 150 | 150 | 150 | 150 | 150 | 30 | 50 | 100 | 200 | 250 | 150 | 150 | 150 | 150 | 150 | 150 | 150 | 150 |
| Barium sulfate | 200 | 200 | 200 | 200 | 200 | 200 | 200 | 200 | 200 | 200 | 160 | 100 | 180 | 300 | 400 | 500 | 550 | 200 |
| Paraffinic oil | 10 | 10 | 10 | 10 | 10 | 10 | 10 | 10 | 10 | 10 | 10 | 10 | 10 | 10 | 10 | 10 | 10 | 10 |
| Carbon black | 15 | 15 | 15 | 15 | 15 | 15 | 15 | 15 | 15 | 15 | 15 | 15 | 15 | 15 | 15 | 15 | 15 | 15 |
| Stearic acid amide | 1 | 1 | 1 | 1 | 1 | 1 | 1 | 1 | 1 | 1 | 1 | 1 | 1 | 1 | 1 | 1 | 1 | 1 |
| Peroxide | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | — |

Comparative Example

Test samples P1 to P7 of sound insulating composite materials (rubber compositions) not according to the present invention were prepared in the same manner as that of the test samples S1 to S18, except that chemical compositions were changed as shown in Table 2. The test sample P7 was prepared by the stacking together the test samples P3 and P6.

TABLE 2

| Chemical Components (parts by weight) | P1 | P2 | P3 | P4 | P5 | P6 |
|---|---|---|---|---|---|---|
| EPDM | 100 | 100 | 100 | — | — | — |
| Polyethylene | — | — | — | — | — | — |
| Polypropylene | — | — | — | 100 | 100 | 100 |
| Zinc oxide | 5 | 5 | 5 | — | — | — |
| Barium sulfate | 200 | 350 | 500 | 200 | 350 | 500 |
| Paraffinic oil | 40 | 40 | 40 | 20 | 20 | 20 |
| Carbon black | 20 | 20 | 20 | 20 | 20 | 20 |
| Stearic acid amide | 1 | 1 | 1 | 1 | 1 | 1 |
| Vulcanication Accelerator | 4 | 4 | 4 | — | — | — |
| Sulfur | 1 | 1 | 1 | — | — | — |
| Peroxide | — | — | — | — | — | — |

Evaluation Tests

The test samples S1–S18 and P1–P6 were subjected to ordinary state properties evaluation tests to determine hardness HS (JIS-A) according to JIS K6253, tensile strength $T_B$ (MPa) according to JIS K6251, and elasticity $E_B$ (%). The results are shown in Tables 3 and 4.

Furthermore, the test samples S3 and S18 were subjected to a thermal aging test by allowing these test samples in a thermostat of 70° C. for 70 hr. After that, hardness, tensile strength and elasticity were measured in the same manner as above. Then, the differences of hardness ($\Delta HS$), tensile strength ($\Delta T_B$) and elasticity ($\Delta E_B$) before and after the thermal aging test were determined respectively. Before the thermal aging test refers to the ordinary state properties. The results are shown in Tables 3 and 4.

Figure 1:
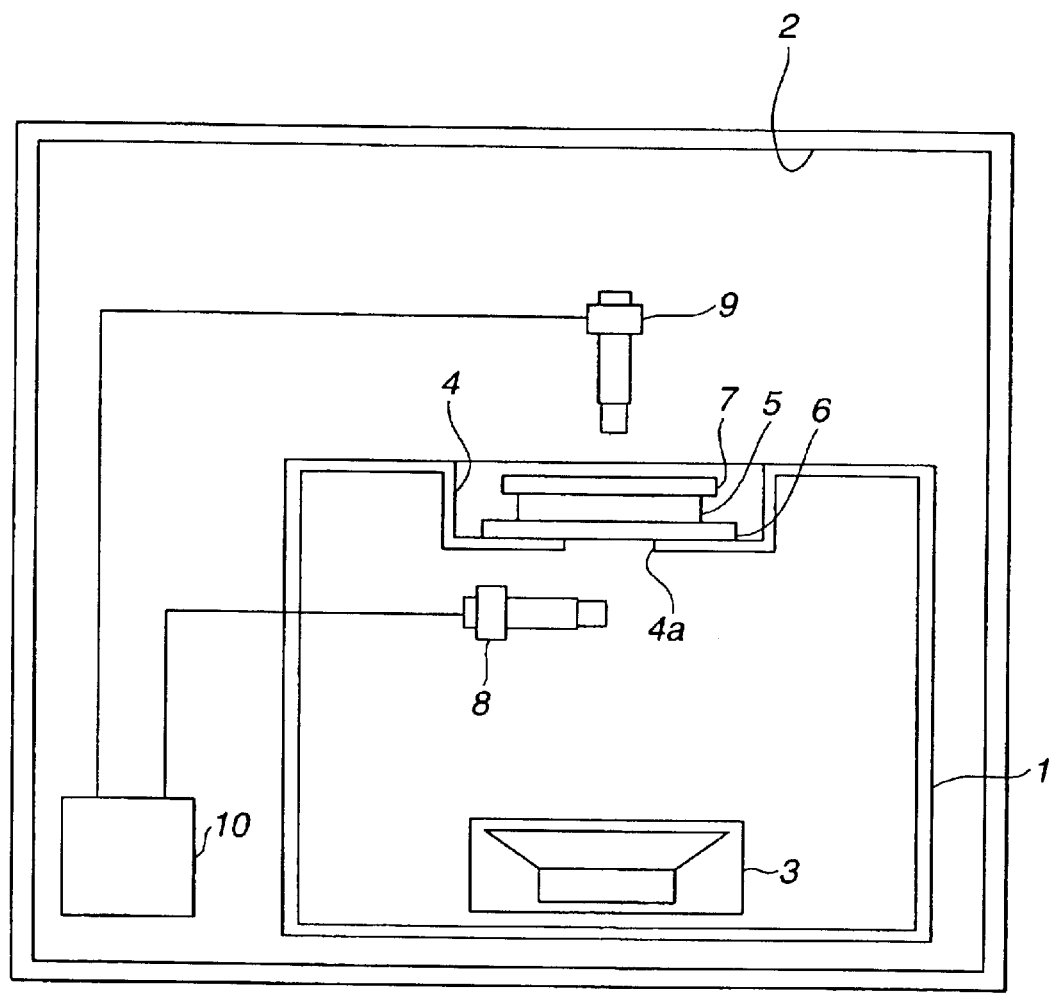
FIG. 1 is a schematic view showing an apparatus for testing samples with respect to sound insulation.

In the column of P7 of Table 4, there are shown the respective necessary ranges for the ordinary state properties and the thermal aging properties that the test sample is required to have when it is used as a sound insulating cover member of FIG. 1. In other words, these necessary ranges are nothing to do with the actual values of the test sample P7.

The test samples S1–S17 and P1–P7 were subjected to a sound insulation evaluation test by measuring the degree of sound insulation against test sounds (oscillation frequency: 600 Hz, 1,000 Hz, 1,400 Hz and 2,000 Hz) using an apparatus of FIG. 1, as explained hereinafter in detail. The results are shown in Tables 3 and 4, in which the number in decibel (dB) refers to the sound intensity difference before and after the test sound passes the test sample. Therefore, a larger number in decibel refers to a better sound insulation.

The test samples S1–S18 and P1–P6 were subjected to specific gravity determination by an underwater replacement method of Japanese Industrial Standard (JIS). The results are shown in Tables 3 and 4.

FIG. 1 shows an apparatus for conducting the sound insulation evaluation test. In FIG. 1, designated by a numeral of 1 is a boxlike soundproof member disposed in a soundproof chamber 2. This soundproof member 1 is formed on its base surface with a speaker 3 (A-characteristic speaker; sound pressure level: a white noise of 100 dB or greater; and analyzed frequency range: 100–20 kHz) for outputting test sounds. The top of the soundproof member 1 is formed at its central portion with a depression 4. This depression 4 has a through hole 4a at its central portion.

Designated by a numeral of 5 in FIG. 1 is a sound insulating cover member having a plate-like shape (exemplary dimensions: 200 mm×200 mm×2 mm). The sound insulating cover member 5 is fixed between first and second fixing plates 6, 7, each having a through hole (not shown in the drawings), and the resulting laminate is placed on a central portion of the depression 4 such that the through holes of the first and second fixing plates 6, 7 are aligned with the through hole 4a of the depression 4 in vertical direction. A first microphone 8 is arranged at a position between the speaker 3 and the depression 4 for collecting the test sound before it passes the sound insulating cover member 5. A second microphone 9 is arranged above the depression 4 for collecting the test sound after it has passed the sound insulating cover member 5. An analyzer 10 is connected to the first and second microphones 8, 9 in order to convert the difference of the test sound frequency before and after the test sound passes the sound insulating cover member 5 into the sound intensity difference (in decibel). Furthermore, the sound intensity difference as a function of frequency of the test sound collected by the first microphone 8 was determined.

TABLE 3

|  | S1 | S2 | S3 | S4 | S5 | S6 | S7 | S8 | S9 | S10 | S11 | S12 | S13 | S14 | S15 | S16 | S17 | S18 |
| --- | --- | --- | --- | --- | --- | --- | --- | --- | --- | --- | --- | --- | --- | --- | --- | --- | --- | --- |
| Ordinary State Properties |  |  |  |  |  |  |  |  |  |  |  |  |  |  |  |  |  |  |
| HS (JIS-A) | 94 | 94 | 95 | 95 | 96 | 94 | 95 | 96 | 97 | 98 | 94 | 92 | 94 | 95 | 96 | 96 | 96 | 95 |
| $T_B$ (MPa) | 7.8 | 7.9 | 7.9 | 8.1 | 6.8 | 7.9 | 8.0 | 8.1 | 8.3 | 8.8 | 7.4 | 7.2 | 7.6 | 8.0 | 8.1 | 8.1 | 6.2 | 7.6 |
| $E_B$ (%) | 200 | 200 | 200 | 210 | 170 | 210 | 210 | 200 | 190 | 150 | 180 | 230 | 190 | 205 | 210 | 210 | 150 | 160 |
| Thermal Aging Properties |  |  |  |  |  |  |  |  |  |  |  |  |  |  |  |  |  |  |
| Δ HS | — | — | 4 | — | — | — | — | — | — | — | — | — | — | — | — | — | — | -11 |
| Δ $T_B$ | — | — | -8 | — | — | — | — | — | — | — | — | — | — | — | — | — | — | -25 |
| Δ $E_B$ | — | — | -10 | — | — | — | — | — | — | — | — | — | — | — | — | — | — | -42 |
| Sound Insulation (dB) |  |  |  |  |  |  |  |  |  |  |  |  |  |  |  |  |  |  |
| 600 Hz | 33 | 35 | 37 | 37 | 37 | 32 | 35 | 36 | 38 | 39 | 34 | 33 | 35 | 38 | 39 | 41 | 41 | — |
| 1,000 Hz | 39.5 | 41 | 42.5 | 43 | 43.2 | 37 | 41.3 | 41.5 | 43 | 44 | 39.2 | 38 | 40.5 | 43 | 44 | 46 | 47 | — |
| 1,400 Hz | 42.3 | 45.8 | 47.7 | 48 | 48.5 | 40.5 | 42 | 45.6 | 48.3 | 49 | 43.5 | 42.5 | 45 | 48.3 | 49 | 50.4 | 51 | — |
| 2,000 Hz | 53.8 | 55.7 | 56.7 | 57 | 57.3 | 50 | 55.6 | 56.3 | 57.3 | 59 | 52.5 | 50.5 | 53 | 57.1 | 59 | 61 | 61.5 | — |
| Specific Gravity | 1.6 | 1.6 | 1.61 | 1.61 | 1.61 | 1.6 | 1.6 | 1.61 | 1.61 | 1.61 | 1.5 | 1.3 | 1.51 | 1.63 | 1.7 | 1.75 | 1.8 | 1.6 |

TABLE 4

|  | P1 | P2 | P3 | P4 | P5 | P6 | P7 |
| --- | --- | --- | --- | --- | --- | --- | --- |
| Ordinary State Properties |  |  |  |  |  |  |  |
| HS (JIS-A) | 75 | 80 | 83 | 90 | 91 | 91 | 80–100 |
| $T_B$ (MPa) | 9.3 | 8.3 | 6.9 | 7.6 | 6.9 | 6.2 | 6.9≦ |
| $E_B$ (%) | 190 | 180 | 160 | 160 | 150 | 130 | 180≦ |
| Thermal Aging Properties |  |  |  |  |  |  |  |
| Δ HS | — | — | — | — | — | — | -10 ≦ Δ HS ≦ 10 |
| Δ $T_B$ | — | — | — | — | — | — | -40≦ |
| Δ $E_B$ | — | — | — | — | — | — | -40≦ |
| Sound Insulation (dB) |  |  |  |  |  |  |  |
| 600 Hz | 17 | 20.5 | 23.5 | 12.4 | 14.7 | 16.2 | 35 |
| 1,000 Hz | 24 | 28 | 31 | 13.2 | 15.5 | 17.2 | 40.7 |
| 1,400 Hz | 29 | 33.5 | 36.5 | 14 | 16.7 | 18.2 | 44.5 |
| 2,000 Hz | 35 | 43 | 45 | 15.5 | 18.2 | 19.5 | 55 |
| Specific Gravity | 1.3 | 1.5 | 1.61 | 1.31 | 1.51 | 1.61 | — |

In comparison between the test samples S1–S10 and the test sample P7 in Tables 3 and 4, it is understood that the test samples S1, S6 and S7 are low in sound insulation and that the test samples S5 and S10 are low in ordinary state properties. In contrast, it is understood that the test samples S2–S4, S8 and S9 are good in the ordinary state properties and sound insulation.

In comparison between the test samples S3 and S11–S17 and the test sample P7 in Tables 3 and 4, it is understood that the test samples S11–S13 are low in sound insulation and that the test sample S17 is low in the ordinary state properties. In contrast, it is understood that the test samples S3 and S14–S16 are good in the ordinary state properties and sound insulation.

In comparison between the test samples S3 and S18 in Table 3, it is understood that S3 is greatly superior to S18.

It is understood from Tables 3 and 4 that the test samples S2–S4, S8, S9 and S14–S16 are greatly superior to the test samples P1–P6 in sound insulation.

Several laminates, similar to the test sample P7, were prepared by stacking together a first test sample (selected from P1 and P2) and a second test sample (selected from P4 and P5). These laminates showed sound insulations similar to that of the test sample P7.

The test samples S3, S11–S12, P3, and P6–P7 were subjected to a sound insulation evaluation test in a manner substantially the same as that of the above-mentioned test, except that frequency of the test sound collected at the first microphone 8 of FIG. 1 was changed from 400 Hz to 2,000 Hz. The results are shown in Tables 5 and 6 and FIGS. 2 and 3.

TABLE 5

| Test Samples | Sound Intensity Differences (dB) over Test Sound Frequencies (400–2000 Hz) | | | | | | | | |
|---|---|---|---|---|---|---|---|---|---|
| | 400 Hz | 500 Hz | 600 Hz | 800 Hz | 1000 Hz | 1400 Hz | 1600 Hz | 1800 Hz | 2000 Hz |
| P3 | 32 dB | 29 dB | 23.5 dB | 28 dB | 31 dB | 36.5 dB | 39 dB | 42 dB | 45 dB |
| P6 | 15.5 dB | 16 dB | 16.2 dB | 16.7 dB | 17.2 dB | 18.2 dB | 18.7 dB | 19.2 dB | 19.5 dB |
| P7 | 32 dB | 33.7 dB | 35 dB | 38 dB | 40.7 dB | 44.5 dB | 48.2 dB | 52.2 dB | 55 dB |
| S3 | 34.5 dB | 35.7 dB | 37 dB | 39.7 dB | 42.5 dB | 47.7 dB | 51.5 dB | 53.7 dB | 56.7 dB |

TABLE 6

| Test Samples | Sound Intensity Differences (dB) over Test Sound Frequencies (400–2000 Hz) | | | | | | | | |
|---|---|---|---|---|---|---|---|---|---|
| | 400 Hz | 500 Hz | 600 Hz | 800 Hz | 1000 Hz | 1400 Hz | 1600 Hz | 1800 Hz | 2000 Hz |
| P7 | 31.5 dB | 33.7 dB | 35 dB | 38 dB | 40.7 dB | 44.5 dB | 48.2 dB | 52.2 dB | 55 dB |
| S3 | 34.5 dB | 35.7 dB | 37 dB | 39.7 dB | 42.5 dB | 47.7 dB | 51.5 dB | 53.7 dB | 56.7 dB |
| S11 | 31.5 dB | 32.7 dB | 34 dB | 36.7 dB | 39.2 dB | 43.5 dB | 47.2 dB | 50 dB | 52.5 dB |
| S12 | 30.5 dB | 31.7 dB | 33 dB | 35.5 dB | 38 dB | 42.5 dB | 45.5 dB | 48 dB | 50 dB |

Figure 2:
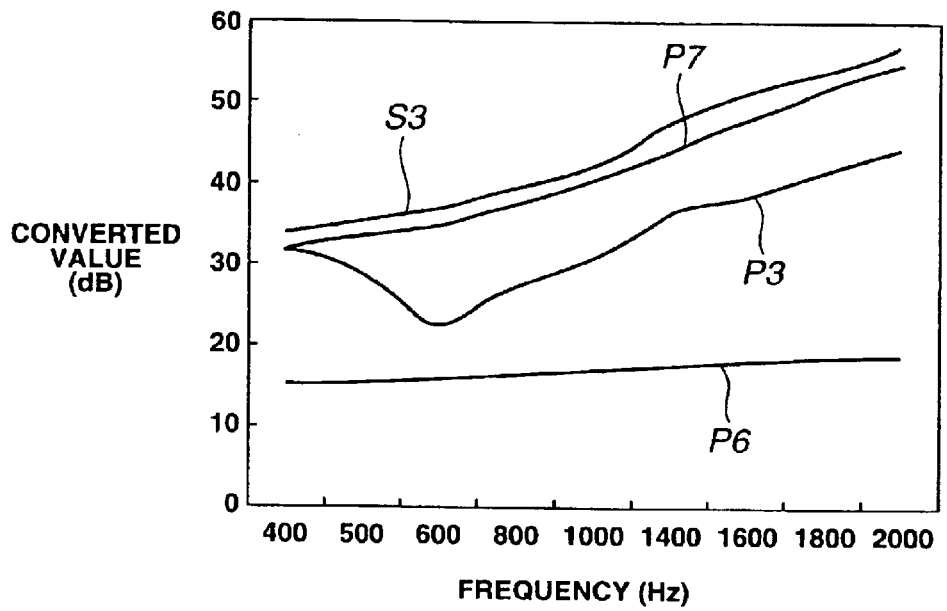
FIGS. 2 and 3 are graphs each showing the sound insulation (expressed in decibel) of the test samples as a function of test sound frequency.
Figure 3:
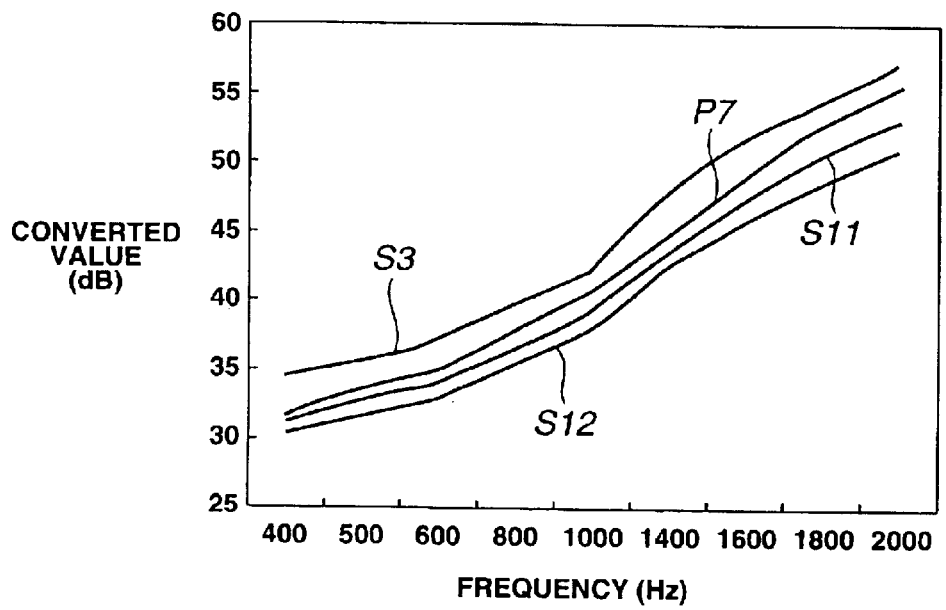

It is understood from Tables 5 and 6 and FIGS. 2 and 3 that, although the test sample P7 is superior in sound insulation to the test samples P3, P6, S1 and S12, the test sample S3 is further superior in sound insulation to the test sample P7. Furthermore, it is understood that the test sample P3 was low in sound insulation in a frequency range from about 400 Hz to about 1,400 Hz and thereby it was not possible to obtain linearity, as shown in FIG. 2.

As clarified hereinabove, it is understood that a sound insulating composite material according to the present invention is superior in ordinary state properties, sound insulation, heat resistance and weather resistance, as compared with conventional rubber compositions (the test samples P1–P6) containing large amounts of inorganic fillers. Furthermore, a sound insulating cover member according to the present invention is also superior in ordinary state properties, sound insulation, heat resistance, weather resistance, parts production cost and mounting easiness, as compared with another conventional two-layered cover member (the test sample P7). Thus, it is possible to achieve a good sound insulation even under a high temperature atmosphere and various weathers, thereby improving so-called habitability in an automotive passenger compartment. Furthermore, it is possible to easily mount the sound insulating cover member, for example, on automotive dash panel and steering shaft.

Although the invention has been described above by reference to certain embodiments (examples) of the invention, the invention is not limited to the embodiments described above. Modifications and variations of the embodiments described above will occur to those skilled in the art, in light of the above teachings. For example, the sound insulating composite material can also be applied to other automotive parts (e.g., grommet cover). Furthermore, it is possible to use other organic peroxides different from one used in the above example to obtain similar advantageous effects. The scope of the invention is defined with reference to the following claims.

The entire disclosure of Japanese Patent Application No. 2001–105478 filed on Apr. 4, 2001, including specification, drawings, claims and summary, is incorporated herein by reference in its entirety.

What is claimed is:

1. A sound insulating composite material comprising:
   a crosslinked polymer containing 100 parts by weight of an ethylene-propylene rubber, 20–100 parts by weight of a polyethylene, and 100–200 parts by weight of a polypropylene, said crosslinked polymer being prepared by a dynamic crosslinking of said ethylene-propylene rubber with said polyethylene and said polypropylene in the presence of an organic peroxide; and
   an inorganic filler in an amount of 200–500 parts by weight relative to 100 parts by weight of said ethylene-propylene rubber.

2. A sound insulating composite material according to claim 1, wherein said inorganic filler is barium sulfate.

3. A sound insulating composite material according to claim 1, wherein said ethylene-propylene rubber has a number average molecular weight of 350,000–750,000.

4. A sound insulating composite material according to claim 1, wherein said ethylene-propylene rubber comprises a terpolymer prepared by polymerizing ethylene, propylene and unconjugated diene.

5. A sound insulating composite material according to claim 1, further comprising carbon black and a processing aid.

6. A sound insulating composite material according to claim 5, wherein said processing aid comprises a plasticizer and a tackifier.

7. A sound insulating composite material according to claim 6, wherein said plasticizer comprises a paraffinic oil, and said tackifier comprises stearic acid amide.

8. A sound insulating cover member comprising a sound insulating composite material, said material containing:
   a crosslinked polymer containing 100 parts by weight of an ethylene-propylene rubber, 20–100 parts by weight of a polyethylene, and 100–200 parts by weight of a polypropylene, said crosslinked polymer being prepared by a dynamic cross linking of said ethylene-propylene rubber with said polyethylene and said polypropylene in the presence of an organic peroxide; and an inorganic filler in an amount of 200–500 parts by weight relative to 100 parts by weight of said ethylene-propylene rubber.

9. A process for producing a sound insulating composite material, said material comprising:

a crosslinked polymer containing 100 parts by weight of an ethylene-propylene rubber, 20–100 parts by weight of a polyethylene, and 100–200 parts by weight of a polypropylene, said crosslinked polymer being prepared by a dynamic crosslinking of said ethylene-propylene rubber with said polyethylene and said polypropylene in the presence of an organic peroxide; and an inorganic filler in an amount of 200–500 parts by weight relative to 100 parts by weight of said ethylene-propylene rubber, said process comprising:

(a) preparing a mixture containing said ethylene-propylene rubber, said polyethylene, said polypropylene, and said organic peroxide; and (b) kneading said mixture while said mixture is in a melted condition, thereby effecting said dynamic crosslinking.

10. A sound insulating composite material according to claim 1, wherein the crosslinked polymer consists essentially of 100 parts by weight of the ethylene-propylene rubber, 20–100 parts by weight of the polyethylene, 100–200 parts by weight of the polypropylene, the organic peroxide, a carbon black and a processing aid.

* * * * *